(12) United States Patent
Nishimine et al.

(10) Patent No.: US 8,100,804 B2
(45) Date of Patent: Jan. 24, 2012

(54) HYDRAULIC CONTROL SYSTEM AND METHOD FOR AUTOMATIC TRANSMISSION FOR A VEHICLE

(75) Inventors: Akiko Nishimine, Toyota (JP); Kenichi Tsuchida, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 406 days.

(21) Appl. No.: 12/518,806

(22) PCT Filed: Dec. 5, 2007

(86) PCT No.: PCT/IB2007/003771
§ 371 (c)(1),
(2), (4) Date: Jul. 30, 2009

(87) PCT Pub. No.: WO2008/072051
PCT Pub. Date: Jun. 19, 2008

(65) Prior Publication Data
US 2009/0280953 A1 Nov. 12, 2009

(30) Foreign Application Priority Data
Dec. 13, 2006 (JP) ................. 2006-336018

(51) Int. Cl.
*F16H 31/00* (2006.01)
(52) U.S. Cl. ........................................ 475/131

(58) Field of Classification Search ............ 475/131
See application file for complete search history.

(56) References Cited

U.S. PATENT DOCUMENTS

| | | | | | |
|---|---|---|---|---|---|
| 4,222,292 | A | * | 9/1980 | Will et al. ............ | 477/116 |
| 4,346,626 | A | * | 8/1982 | Kawamoto ............ | 477/117 |
| 5,351,577 | A | * | 10/1994 | Ando et al. ............ | 477/116 |
| 5,797,821 | A | * | 8/1998 | Fujimoto et al. ...... | 475/120 |
| 5,813,941 | A | * | 9/1998 | Jang ..................... | 477/116 |
| 6,746,355 | B2 | * | 6/2004 | Shin et al. ............. | 475/119 |
| 2004/0058771 | A1 | | 3/2004 | Shin | |

FOREIGN PATENT DOCUMENTS

| | | |
|---|---|---|
| EP | 1 028 276 A | 8/2000 |
| JP | 2005-273879 A | 10/2005 |

* cited by examiner

*Primary Examiner* — Dirk Wright
(74) *Attorney, Agent, or Firm* — Kenyon & Kenyon LLP

(57) ABSTRACT

A hydraulic control system for an automatic transmission, which includes a brake, used to establish a first gear step and a reverse gear step. The hydraulic control system includes a first solenoid valve, a second solenoid valve and a control valve, which is switched by a hydraulic signal from the second solenoid valve, and that are operated simultaneously to engage the first-gear step and reverse gear step engagement element; and an neutral gear position engagement control unit that activates both solenoid valves when a shift lever is shifted to neutral to engage the brake. Thus, the generation of a shock may be prevented when the shift lever is shifted from the N position to an R position.

13 Claims, 8 Drawing Sheets

FIG. 2

| SHIFT POSITIONS | | SOLENOID VALVES | | | | | | ENGAGEMENT ELEMENTS | | | | | | |
|---|---|---|---|---|---|---|---|---|---|---|---|---|---|---|
| | | SL1 N/C | SL2 N/C | SL3 N/C | SL4 N/C | SLU N/C | SL N/C | C1 | C2 | B1 | B2 | B3 | OWC | L/C |
| P | | ○ | × | × | △ | △ | × | × | × | × | △ | × | × | × |
| P (B3 ENGAGED) | | ○ | × | × | △ | × | ○ | × | × | × | × | △ | × | × |
| R | | × | × | × | ○ | × | × | × | × | × | ○ | ○ | × | × |
| N⇔R | | × | × | × | △ | × | ○ | × | × | × | ○ | △ | × | × |
| R-PROHIBITED | | × | × | × | × | ○ | ○ | × | × | × | × | × | × | × |
| N (B2 ENGAGED) | | ○ | × | × | △ | △ | × | × | × | × | △ | × | × | × |
| N (B2 DISENGAGED) | | ○ | × | × | × | × | ○ | × | × | × | × | × | × | × |
| D·B | 1STon | ○ | × | × | × | △ | × | ○ | × | × | × | × | ○ | △ |
| | 1SToff | ○ | × | × | × | × | ○ | ○ | × | × | × | × | ○ | × |
| | EGB | ○ | × | ○ | × | ○ | × | ○ | × | × | × | × | △ | △ |
| | 2ND | △ | × | △ | × | △ | ○ | △ | × | ○ | × | × | × | × |
| | N CONTROL | ○ | × | × | × | △ | × | ○ | × | △ | × | × | ○ | × |
| | 3RD | ○ | × | × | ○ | △ | ○ | ○ | × | × | × | × | × | △ |
| | 4TH | ○ | ○ | × | × | △ | ○ | × | ○ | × | × | × | × | △ |
| | 5TH | × | ○ | × | ○ | △ | ○ | × | ○ | × | × | ○ | × | △ |
| | 6TH | × | ○ | ○ | × | △ | ○ | × | ○ | ○ | × | × | × | △ |

○ : COMPLETELY ENGAGED
△ : ENGAGED BY REGULATED PRESSURE
× : RELEASED

IN CASE OF TOTAL DISCONNECTION: 5th GEAR STEP OR HIGHER IS 5th, 4th GEAR STEP OR LOWER IS 3rd, RE-D→N→NEXT 3rd GEAR STEP

HYDRAULIC CONTROL SYSTEM AND METHOD FOR AUTOMATIC TRANSMISSION FOR A VEHICLE

This is a 371 national phase application of PCT/IB2007/003771 filed 5 Dec. 2007, claiming priority to Japanese Patent Application No. 2006-336018 filed 13 Dec. 2006, the contents of which are incorporated herein by reference.

BACKGROUND OF THE INVENTION

1. Field of the Invention

The present invention relates to a hydraulic control system and method for an automatic transmission used in a vehicle; and, more particularly, to a technique for avoiding generating a shock in the automatic transmission when a gear is shifted from a neutral position to a reverse position.

2. Background of the Invention

Japanese Patent Application Publication No. 2005-273879 describes an automatic transmission for a vehicle that includes a first-gear step and reverse gear step engagement element used for establishing a first gear step and a reverse gear step, which can enter any of a plurality of shift gear steps having different transmission gear ratios by selectively engaging a plurality of engagement elements. In this automatic transmission, when a gear selection device is shifted to the reverse position (R position), a reverse range pressure (R-range pressure) supplied from a manual valve is exerted on the first-gear step and reverse gear step engagement element as an original pressure thereof. However, when the gear selection device is shifted to the neutral position (N position), the first-gear step and reverse gear step engagement element becomes disengaged.

However, in the above-described hydraulic control system, when the gear selection device is shifted from the N position to the R position when the vehicle is stopped, the R-range pressure is directly applied to the first-gear step and reverse gear step engagement element without being pressure-regulated or flow-rate-controlled. Thus, the first-gear step and reverse gear step engagement element may be brought into a quick engagement, so that rotary elements of the automatic transmission having high rotational inertia, such as drums or ring gears, which have been rotated in conjunction, may be abruptly stopped, thereby generating a shock in the automatic transmission.

SUMMARY OF THE INVENTION

The present invention provides a hydraulic control system and method for an automatic transmission of a vehicle that prevents a shock in the automatic transmission when the gear selection device is shifted from the N position to the R position.

In accordance with one aspect of the present invention, there is provided a hydraulic control system for an automatic transmission, wherein the automatic transmission establishes a plurality of transmission gear steps by selectively operating a plurality of engagement elements, including a first-gear step and reverse gear step engagement element for establishing a first gear step, and a reverse gear step. In the hydraulic control system, the first-gear step and reverse gear step engagement element is engaged when a gear selection device is shifted to a reverse gear step position. Further, the hydraulic system includes a first solenoid valve and a second solenoid valve that engage the first-gear step and reverse gear step engagement element by operating simultaneously; and an N position engagement control unit that activates both the first solenoid valve and the second solenoid valve while the gear selection device is shifted to a neutral gear step position, thereby enabling an engagement of the first-gear step and reverse gear step engagement element.

With this configuration of the hydraulic control system for an automatic transmission, when the gear selection device is in the N position, two solenoid valves (i.e., the first solenoid valve and the second solenoid valve) are activated by the N position engagement control unit to thereby engage the first-gear step and reverse gear step engagement element. Therefore, when the gear selection device is shifted from the N position to the R position, the reverse gear step can be established through the engagement of a second engagement element, because the first-gear step and reverse gear step engagement element has remains engaged. Thus, it is possible to appropriately prevent the generation of shock in the automatic transmission when shifting the gear selection device from the N position to the R position.

Further, because the two solenoid valves (i.e., the first solenoid valve and the second solenoid valve) are driven to engage the first-gear step and reverse gear step engagement element, the first-gear step and reverse gear step engagement element does not become engaged when a single failure occurs in either the first or the second solenoid valve. Therefore, when the gear selection device is shifted from the D position to the N position while the vehicle is in motion, an excessive rotation of the rotary elements in the automatic transmission caused by the engagement of the first-gear step and reverse gear step engagement element (i.e., ON-fail) may be avoided.

In the configuration as described above, when the gear selection device is shifted to the neutral gear step position (N position) while the vehicle is stopped, the N position engagement control unit may activate both the first solenoid valve and the second solenoid valve to engage the first-gear step and reverse gear step engagement element. Further, while the vehicle is in motion, the N position engagement control unit may inactivate both the first solenoid valve and the second solenoid valve to disengage the first-gear step and reverse gear step engagement element. With this configuration, it is possible to prevent a tie-up from occurring when the gear selection device is shifted to the N position while the vehicle is in motion.

Further, the hydraulic control system may further include a drain flow rate control valve that controls the flow rate of oil drained from the first-gear step and reverse gear step engagement element. With this configuration, the flow rate of the oil drained from the first-gear step and reverse gear step engagement element may be adjusted by the drain flow rate control valve. For example, when the gear selection device is shifted from the reverse gear step, which is established by both of the first-gear step and reverse gear step engagement element and a second engagement element, to the N position, an R→N control is executed so that oil is first drained from the second engagement element and then oil is drained from the first-gear step and reverse gear step engagement element thereby preventing the generation of a shock in the automatic transmission.

Further, if the gear selection device is shifted from the N position to the D position when the first-gear step and reverse gear step engagement element is engaged, the second engagement element engaged. If, at this time, the first-gear step and reverse gear step engagement element has not yet been disengaged, tie-up may occur. To avoid this problem, an N→D control, which is compatible with the R→N control, may be executed to quickly drain oil from the first-gear step and reverse gear step engagement element. Therefore, at the N→D control, it is possible to prevent tie-up, which may be caused by a delay in draining the first-gear step and reverse gear step engagement element, from occurring.

Further, the hydraulic control system may further include a switching valve that supplies an output pressure, which is output from either the first solenoid valve or the second solenoid valve to the first-gear step and reverse gear step engagement element, to either the first-gear step and reverse gear step engagement element or the second engagement element of the plurality of engagement elements. With this configuration, the output pressure is prevented from being supplied to both of the first-gear step and reverse gear step engagement element and the second engagement element. Thus, an inappropriate gear step, which may be established through the simultaneous engagement of both of the first-gear step and reverse gear step engagement element and the second engagement element, may be avoided.

Further, the switching valve may switch between supplying a regulation pressure and a holding pressure supplied to the second engagement element. With this configuration, it is unnecessary to provide an additional solenoid valve to control the engagement pressure of t the second engagement element.

Further, when the automatic transmission enters a transmission gear step, the switching valve is switched to prevent an output pressure from being supplied to the second engagement element. With this configuration, when the automatic transmission establishes, e.g., the fourth gear step, the hydraulic pressure is prevented from being supplied to the second engagement element. Thus, a fail safe may be achieved by using one switching valve.

Further, the hydraulic system may further include a drain communication path that communicates a drain path of the switching valve with a drain path of the drain flow rate control valve when the automatic transmission enters a specified transmission gear step. With this configuration, when the automatic transmission enters, e.g., the fourth gear step, a drain path the second engagement element may be formed via the switching valve.

Further, the hydraulic system may further include a hydraulic transmission unit, provided in an input side of the automatic transmission, that has a lock-up clutch attached thereto; a lock-up clutch switching valve that engages and disengages the lock-up clutch; and a manual valve for outputting a D-range pressure when the gear selection device is shifted to a D gear step position, wherein the lock-up clutch switching valve is switched by the D-range pressure. With this configuration, when shifting from the N position to the R position, an engine stall caused by a solenoid drain delay is avoided.

In accordance with second aspect of the present invention, there is provided control method for an automatic transmission, wherein the automatic transmission is operated to establish a plurality of transmission gear steps by selectively operating a plurality of engagement elements including a first-gear step and reverse gear step engagement element for establishing a first gear step and a reverse gear step. Herein, the first-gear step and reverse gear step engagement element is engaged when a gear selection device is shifted to a reverse gear step position, and, while the gear selection device is shifted to a neutral gear step position, an engagement of the first-gear step and reverse gear step engagement element is enabled.

In the above-described second aspect, the automatic transmission may further includes a first solenoid valve and a second solenoid valve that are operated simultaneously to engage the first-gear step and reverse gear step engagement element, and the control method may further includes activating both the first solenoid valve and the second solenoid valve to engage the first-gear step and reverse gear step engagement element when the gear selection device is shifted to a neutral gear step position.

In the above-described second aspect, and the control method may further includes activating both the first solenoid valve and the second solenoid valve to engage the first-gear step and reverse gear step engagement element when the gear selection device is shifted to the neutral gear step position when the vehicle is stopped; and deactivating wherein both the first solenoid valve and the second solenoid valve to disengage the first-gear step and reverse gear step engagement element when the vehicle is in motion.

In the above-described second aspect, and the control method may supplying an output pressure, which is output from either the first solenoid valve or the second solenoid valve to the first-gear step and reverse gear step engagement element, to either the first-gear step and reverse gear step engagement element or a second engagement element.

In the above-described second aspect, the control method may further include, interrupting the supply of the output pressure to the second engagement element when the automatic transmission enters a specified transmission gear step.

In the above-described second aspect, a hydraulic transmission unit; a lock-up clutch, attached to the hydraulic transmission unit; and a lock-up clutch switching valve that is switched to engage and disengage the lock-up clutch may be provided in an input side of the automatic transmission, and the control method may further includes, switching the lock-up clutch switching valve using the D-range pressure when the gear selection device is shifted to a D gear step position.

BRIEF DESCRIPTION OF THE DRAWINGS

The features and advantages of the present invention will become apparent from the following description of example embodiments with reference to the accompanying drawings, wherein like numerals are used to represent like elements and wherein:

FIG. 2 is a table illustrating a combination of engaged states and disengaged states of clutches and brakes for establishing respective shift gear steps of the automatic transmission shown in FIG. 1;

DETAILED DESCRIPTION OF THE EMBODIMENTS

Hereinafter, embodiments of the present invention will be described in detail with reference to the accompanying drawings.

Figure 1:
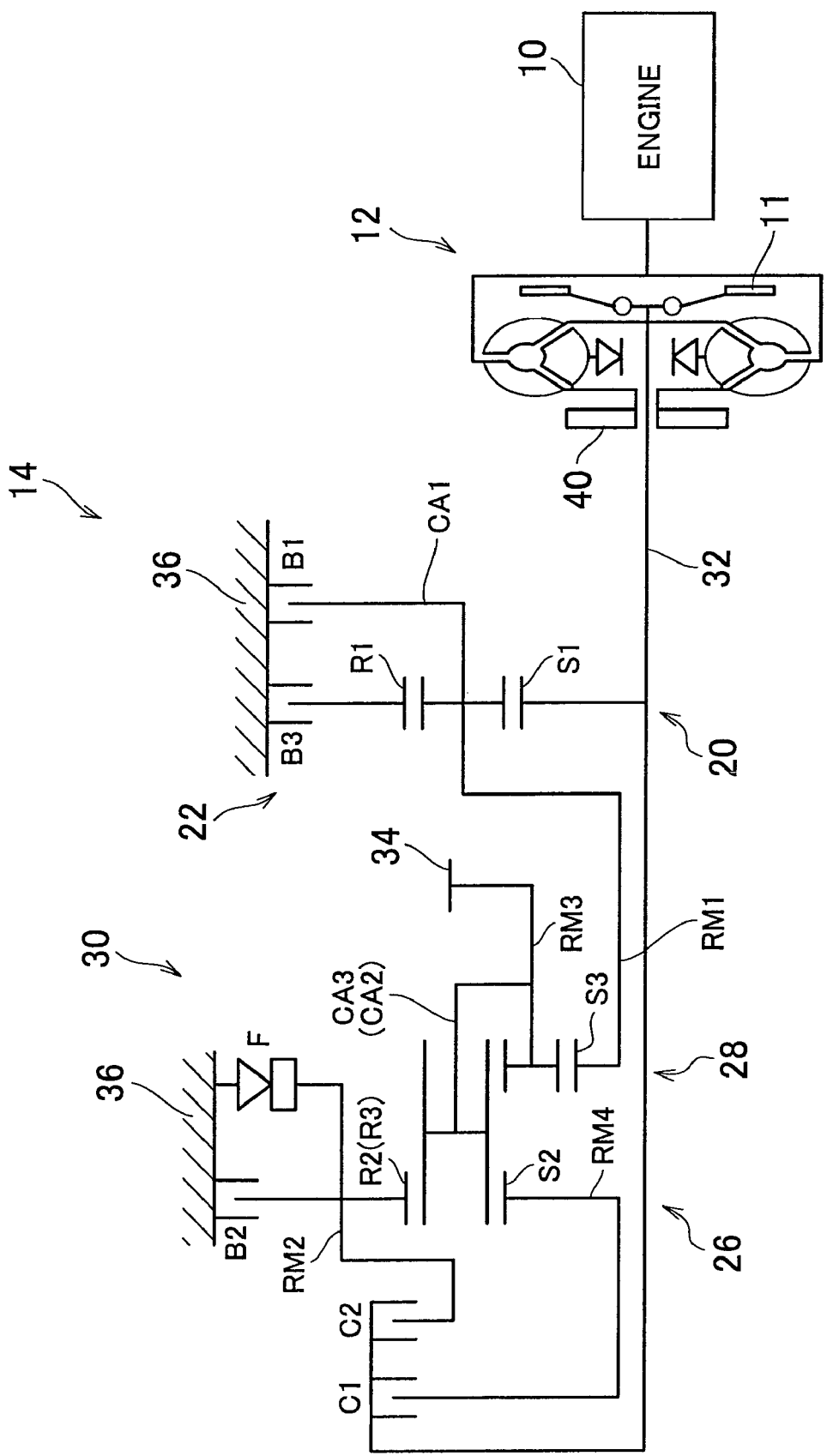
FIG. 1 is a schematic diagram illustrating a construction of a drive system of a vehicle adopting an embodiment of the present invention.

FIG. 1 is a diagram illustrating a drive system for use in a vehicle having a transverse engine arrangement such as an FF (front engine/front wheel drive) arrangement. The drive system is configured such that the output power of an engine 10 such as a gasoline or diesel engine is transmitted to drive wheels (front wheels) by way of a torque converter 12 that includes a lock-up clutch 11 and that is connected with an automatic transmission 14 and a differential gear mechanism (not shown). The engine 10 functions as a drive power source of the vehicle, and the torque converter 12 functions as a hydraulic transmission unit.

The automatic transmission 14 includes a first transmission part 22 configured mainly by a first planetary gear set 20 of a single pinion type; and a second transmission part 30 configured mainly by a second planetary gear set 26 of a single pinion type; and a third planetary gear set 28 of a double pinion type, wherein the first and the second transmission part 22 and 30 are coaxially arranged, so that a rotation of an input shaft 32 can be output through an output gear 34 after changing a speed of the rotation.

The input shaft 32 corresponds to an input element, and is configured as a turbine shaft of the torque converter 12 in the present embodiment. The output gear 34 corresponds to an output element, and drives the left and right drive wheels via the differential gear mechanism to rotate the drive wheels. Further, the structure of the automatic transmission 14 is symmetrical around the central axis thereof. In FIG. 1, a lower part of the symmetrical structure of the automatic transmission 14 below the central axis is omitted.

The first planetary gear set 20, which constitutes the first transmission part 22, includes three rotary elements, which are a sun gear S1, a carrier CA1, and a ring gear R1. The sun gear S1 is connected to the input shaft 32 and is rotated thereby, while the ring gear R1 is fixed to a transmission casing 36 (hereinbelow, referred to simply as a "casing") via a third brake B3 such that the ring gear R1 cannot rotated. Thus, the carrier CA1 functioning as an intermediate output element outputs the rotating force of the input shaft 32 after reducing the speed of the rotation.

Further, the second and the third planetary gear set 26 and 28, which constitute the second transmission part 30, are partially coupled to each other, thus forming four rotary elements RM1 to RM4. Specifically, the sun gear S3 of the third planetary gear set 28 forms the first rotary element RM1. The ring gear R2 of the second planetary gear set 26 and the ring gear R3 of the third planetary gear set 28 are coupled to each other and form the second rotary element RM2. The carrier CA2 of the second planetary gear set 26 and the carrier CA3 of the third planetary gear set 28 are coupled to each other and form the third rotary element RM3. The sun gear S2 of the second planetary gear set 26 forms the fourth rotary element RM4. The second and the third planetary gear set 26 and 28 commonly use the carrier CA2, CA3 and the ring gear R2, R3. Further, a pinion gear of the second planetary gear set 26 is also used as a second pinion gear (outer pinion gear) of the third planetary gear set 28 to form a Ravigneaux planetary gear train.

The first rotary element RM1 (sun gear S3) is selectively connected to the casing 36 via the first brake B1, so that the rotation thereof is stopped. The second rotary element RM2 (ring gear R2, R3) is selectively connected to the casing 36 via the second brake B2, so that the rotation thereof is stopped. The fourth rotary element RM4 (sun gear S2) is selectively connected to the input shaft 32 via the first clutch C1, while the second rotary element RM2 (ring gear R2, R3) is selectively connected to the input shaft 32 via the second clutch C2.

Further, the first rotary element RM1 (sun gear S3) is connected to the carrier CA1 of the first planetary gear set 20 as a single body, which functions as an intermediate output element. The third rotary element RM3 (carrier CA2, CA3) is connected to the output gear 34 as a single body to output a rotating force. Further, a one-way clutch F is arranged in parallel to the second brake B2 between the second rotary element RM2 (ring gear R2, R3) and the casing 36, such that the one-way clutch allows the second rotary element RM2 to be rotated in a forward rotating direction (i.e., a rotating direction of the input shaft 32), and prevents a reverse rotation thereof.

The clutches C1, C2 and the brakes B1, B2, B3 (hereinafter, simply referred to as "clutches C", "brakes B" if a particular clutch or brake is not specified among them) correspond to a plurality of engagement elements in a hydraulic frictional coupling device, which are a multiple disc clutch or a band brake controlled by a hydraulic actuator engaged therewith. Further, by controlling excitation and de-excitation of the linear solenoid valves SL1 to SL4 in a hydraulic control circuit 98 (see FIG. 3) or a manual valve, an engaged state and a disengaged state are established as shown in FIG. 2. Further, respective gear steps including six forward steps and one reverse step are established according to the position of a shift lever 72 (see FIG. 3).

The indications "1st" to "6th" in FIG. 2 denote the first forward gear step to the sixth forward gear step, and R denotes the reverse gear step, in which the transmission gear ratio (=input shaft rpm $N_{IN}$/output shaft rpm $N_{OUT}$) thereof is appropriately determined according to respective gear ratios $\rho1$, $\rho2$ and $\rho3$ of the first, second and the third planetary gear set 20, 26, and 28. In FIG. 2, "O" means complete engagement, "Δ" means engagement by regulated pressure, and "X" means disengagement. Because a one-way clutch F is installed in parallel to the brake B2 that establishes the first gear step, it is not necessary to engage the brake B2 during an engine start (acceleration).

Figure 4:
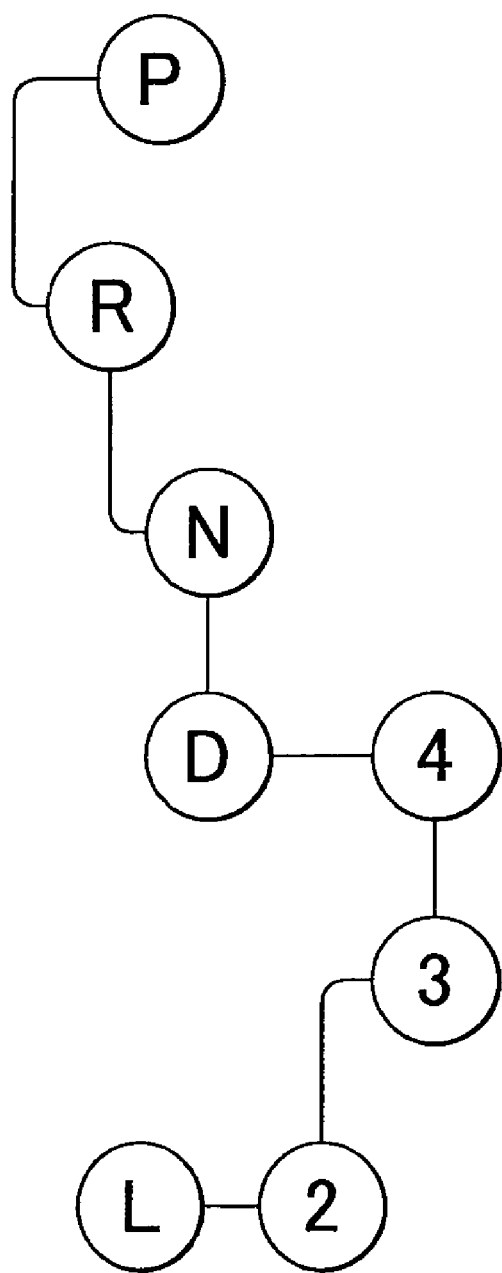
FIG. 4 is a view illustrating an example of a shift pattern of a shift lever shown in FIG. 3.

The shift lever 72 is an embodiment of a gear selection device, and is shifted between a parking position P, a reverse drive position R, a neutral position N, and forward drive positions D, 4, 3, 2 and L as shown in a shift pattern shown in FIG. 4. In the P and N positions, a neutral state is established to prevent a power transmission. Further, in the P position, the drive wheels are mechanically stopped by a mechanical parking mechanism (not shown) to prevent the drive wheels from rotating.

Figure 3:
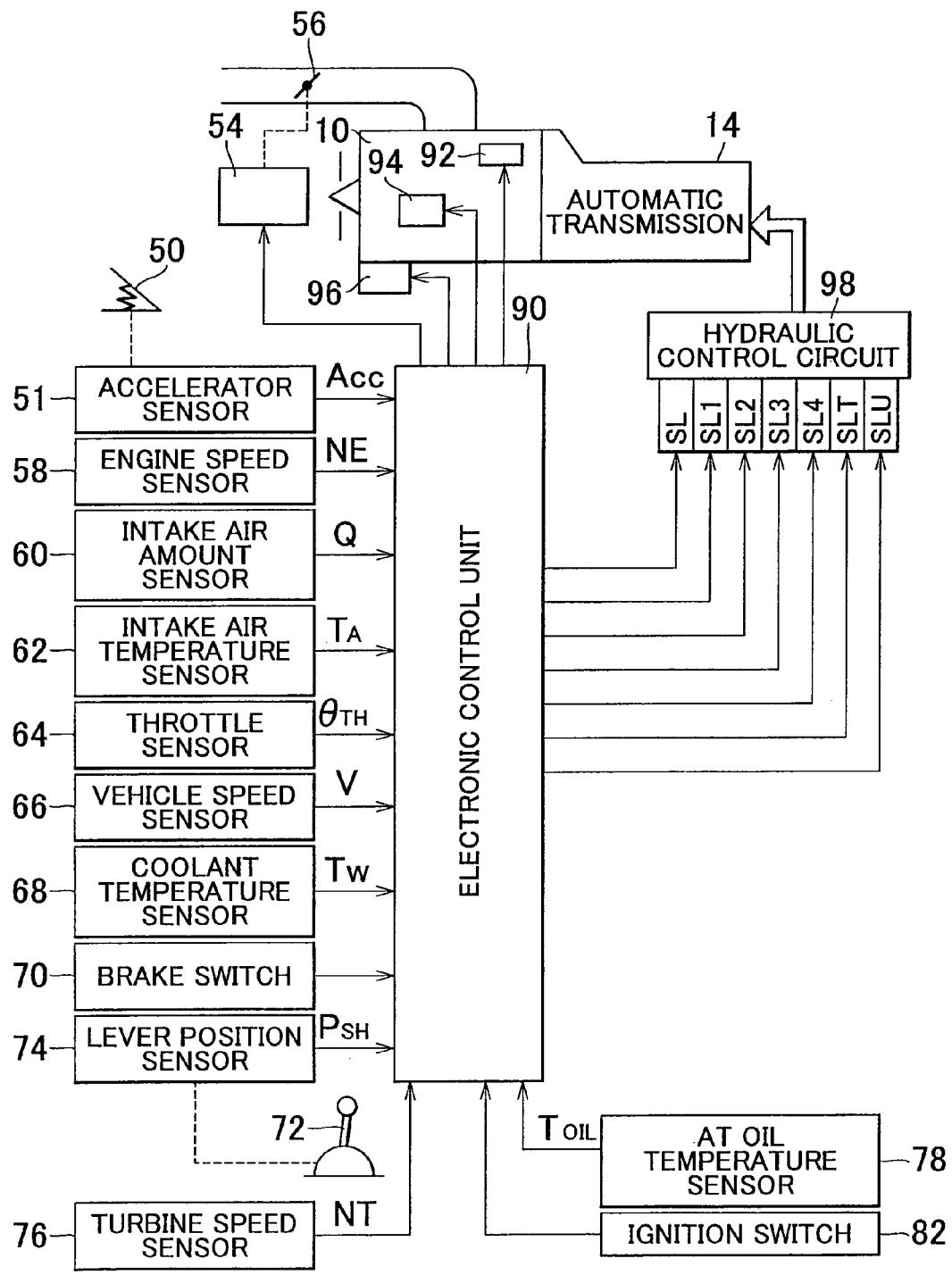
FIG. 3 is a block diagram illustrating input and output signals of an electronic control unit provided in the vehicle adopting the embodiment of FIG. 1.

FIG. 3 is a block diagram illustrating a control system provided in the vehicle to control the engine 10 and the automatic transmission 14 shown in FIG. 1 and the like. In the control system, an accelerator sensor 51 detects the operation amount Acc (accelerator opening degree) of an accelerator pedal 50. The accelerator pedal 50 is an embodiment of an accelerator manipulation device, which is generally depressed by a driver's foot in accordance with the output power desired by the driver. The accelerator operation amount Acc generally indicates the desired output power. Further, in a intake pipe of the engine 10 is provided an electronic throttle valve 56, whose opening degree $\theta_{TH}$ is controlled by a throttle actuator 54.

In addition, the control system further includes an engine speed sensor 58 for detecting the engine speed NE; an intake air amount sensor 60 for detecting an intake air amount Q in the engine 10; an intake air temperature sensor 62 for detecting an intake air temperature $T_A$; a throttle sensor 64 having an idle switch attached thereto, for detecting a fully closed state (idle state) of the electronic throttle valve 56 and the opening degree $\theta_{TH}$; a vehicle speed sensor 66 for detecting the rotational speed $N_{OUT}$ of the output gear 34 (equivalent to the rotational speed of the output shaft), which corresponds to a vehicle speed V; a coolant temperature sensor 68 for detecting a coolant temperature $T_W$ of the engine 10; a brake switch 70 for detecting a manipulation of a foot brake; a lever position sensor 74 for detecting a selected position $P_{SH}$ of the shift lever 72; a turbine speed sensor 76 for detecting the turbine rotational speed NT; an AT oil temperature sensor 78 for detecting an AT oil temperature $T_{OIL}$, which is a temperature of actuation oil in the hydraulic control circuit 98; and an ignition switch 82.

Thus, signals, that indicate the engine speed NE, the intake air amount Q, the intake air temperature $T_A$, the throttle valve opening degree $\theta_{TH}$, the vehicle speed V (the output shaft rotational speed $N_{OUT}$), the engine coolant temperature $T_W$, the manipulation of the brake, the selected position $P_{SH}$ of the shift lever 72, the turbine rotational speed NT, the AT oil temperature $T_{OIL}$ and a manipulated position of the ignition switch 82, are sent from the respective sensors to an electronic control unit 90. The turbine rotational speed NT is equal to the rotational speed of the input shaft 32 (input shaft rpm $N_{IN}$), which functions as an input element.

Figure 5:
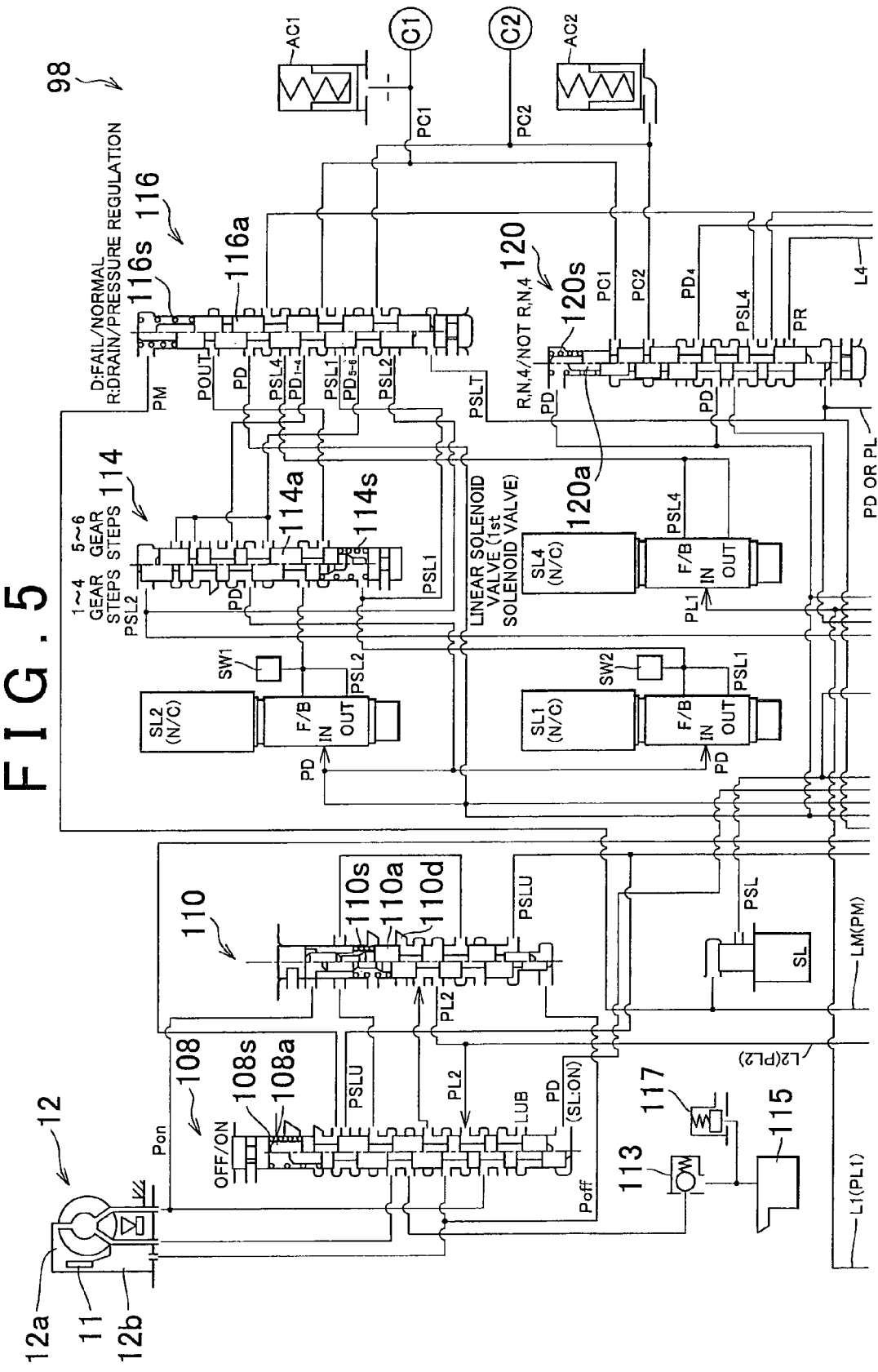
FIG. 5 is a conceptual diagram illustrating the construction of a hydraulic control circuit shown in FIG. 3 in cooperation with FIG. 6.
Figure 6:
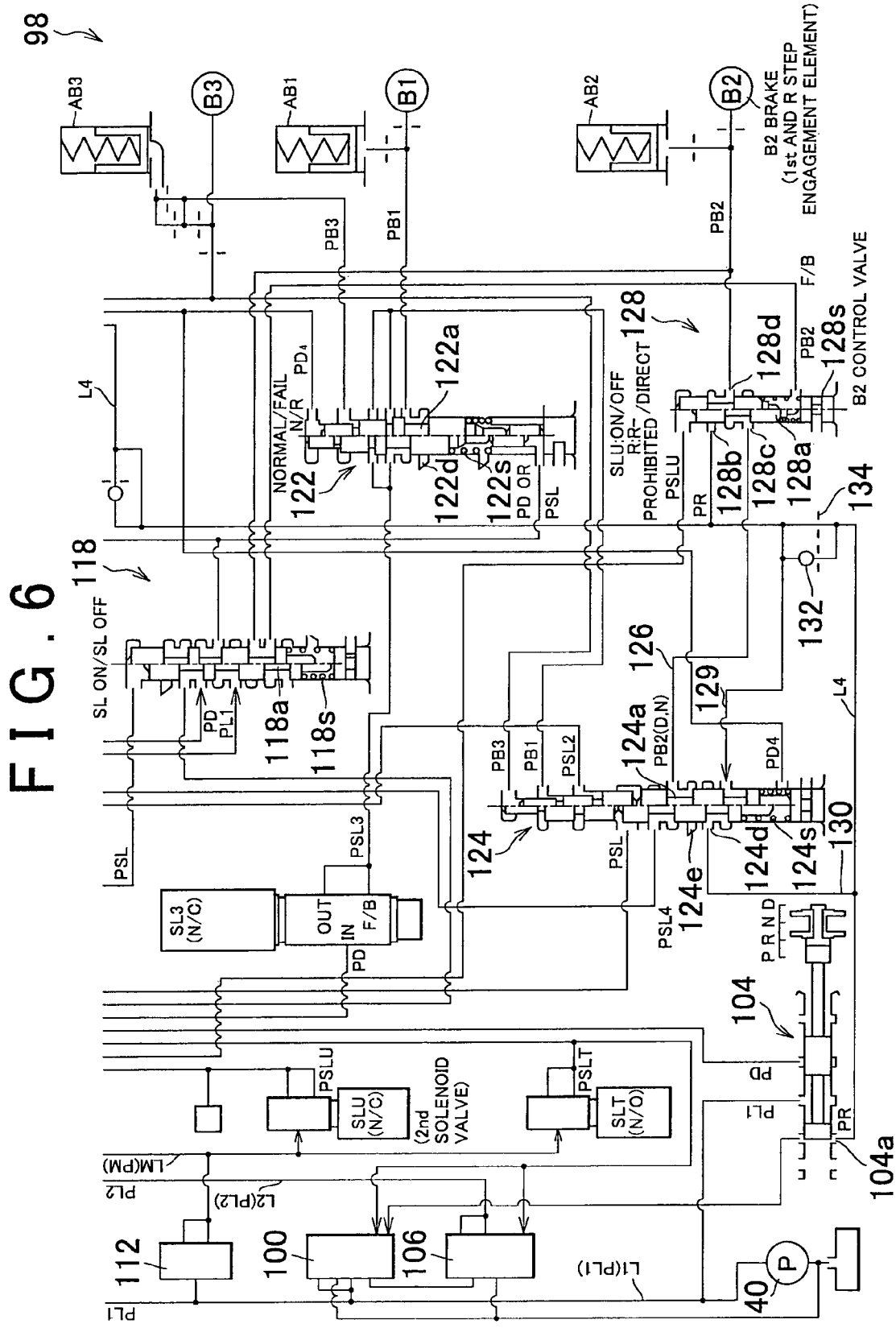
FIG. 6 is a conceptual diagram illustrating the construction of the hydraulic control circuit shown in FIG. 3 in cooperation with FIG. 5.

The hydraulic control circuit 98 includes the hydraulic circuits shown in FIGS. 5 and 6 for controlling the operation of the automatic transmission 14. As shown in FIGS. 5 and 6, the actuation oil transferred from an oil pump 40 is pressure-regulated by a first regulator valve 100 of a relief type, thereby forming a first line pressure PL1. The oil pump 40 is, for example, a mechanical pump driven by the engine 10. The first regulator valve 100 regulates the hydraulic pressure in response to a signal pressure PSLT supplied from a linear solenoid valve SLT. The signal pressure PSLT, which indicates a turbine torque $T_T$ (i.e., an input torque $T_{IN}$ of the automatic transmission 14) or the throttle valve opening degree $\theta_{TH}$ corresponding thereto, is supplied from the linear solenoid valve SLT to the first regulator valve 100.

The first regulator valve 100 regulates the first line pressure PL1 according to the input torque $T_{IN}$ of the automatic transmission 14 based on the signal pressure PSLT. The first line pressure PL1 is supplied via the first line path L1 to a manual valve 104 and a linear solenoid valve SL4, which are operated in conjunction with the shift lever 72. Further, when the shift lever 72 is in a forward drive position such as the D position, a D-range pressure PD is supplied from the manual valve 104 to a first to a third linear solenoid valves SL1 to SL3, and a fourth linear solenoid valve SL4 is supplied with the first line pressure PL1.

The linear solenoid valves SL1, SL2, SL3, SL4 are arranged in a manner corresponding to the clutches C1, C2 and the brakes B1, B2, B3. Further, the excitations of the linear solenoid valves SL1, SL2, SL3, SL4 are controlled in response to a drive signal output (instruction hydraulic pressure) from the electronic control unit 90, so that engagement hydraulic pressures PC1, PC2, PB1, PB2, PB3 of the clutches C1, C2 and the brakes B1, B2, B3 are controlled independently. Thus, it is possible to establish any one of the first to the sixth gear step "1st" to "6th" and the reverse gear step "Rev".

The linear solenoid valves SL1 to SL4 are large-capacity valves, and the output hydraulic pressures PSL1, PSL2, PSL3, PSL4 thereof are supplied to the clutches C1, C2 and the brakes B1, B2, B3, thereby directly controlling the engagement hydraulic pressures PC1, PC2, PB1, PB2, PB3 thereof. ON/OFF hydraulic switches SW1 and SW2 are connected to the first and second linear solenoid valves SL1 and SL2, respectively. When the output hydraulic pressures PSL1 and PSL2 of the linear solenoid valves SL1 and SL2 are higher than specific levels, the solenoid valves SL1 and SL2 are switched on, and a hydraulic pressure signal indicating an output of hydraulic pressure is supplied to the electronic control unit 90. Further, respective accumulators AC1, AC2, AB1, AB2, AB3 are connected to the clutches C1, C2 and the brakes B1, B2, B3, respectively.

A second regulator valve 106 regulates a pressure of the actuation oil flowing from the first regulator valve 100 based on the signal pressure PSLT as an original pressure, thereby forming a second line pressure PL2 according to an input torque of the automatic transmission 14. To use the second line pressure PL2 as the original pressure of the torque converter 12, the second line pressure PL2 is supplied both to a lock-up relay valve 108 and a lock-up control valve 110 via a second line path L2. A third regulator valve 112 regulates a modulator pressure PM using the first line pressure PL1 as an original pressure.

The modulator pressure PM is regulated to be constant regardless of any variation in the original pressure. The modulator pressure PM is supplied as the original pressure to a linear solenoid valve SLT, the linear solenoid valve SLU and the electromagnetic switching valve SL via a modulator pressure path LM.

The lock-up relay valve 108 is forced to be in an OFF position by a restoring force of the return spring 108s, but, when the electromagnetic switching valve SL is ON, the valve spool 108a in the lock-up relay valve 108 is moved to an ON position by a propulsion force formed by the D-range pressure PD(SL: ON) output from a solenoid relay valve 118. When the valve spool 108a is in the ON position, the second line pressure PL2 is supplied to an engaging-side oil chamber 12a in the torque converter 12, and, at the same time, the actuation oil of a disengaging-side oil chamber 12b is drained via the lock-up relay valve 108 and a drain port 110d of the lock-up control valve 110.

However, when the valve spool 108a is in an OFF position, the second line pressure PL2 is supplied to the disengaging-side oil chamber 12b in the torque converter 12, and, at the same time, the actuation oil of the engaging-side oil chamber 12b is drained to a cooler 115 via the lock-up relay valve 108 and the check valve 113. Further, to use the linear solenoid valve SLU when the lock-up clutch 11 is disengaged, when the valve spool 108a is in the OFF position, the lock-up relay valve 108 supplies a hydraulic signal PSLU, which is output from the linear solenoid valve SLU, to a B2 control valve 128 to thereby switch the B2 control valve 128. Further, reference numeral "117" denotes a cooler bypass valve.

The lock-up control valve 110 includes a valve spool 110a, which is moved to a position at which a restoring force of the return spring 110s and a propulsion force generated by a pressure $P_{on}$ of the engaging-side oil chamber 12a, another propulsion force generated by a pressure $P_{off}$ of the disengaging-side oil chamber 12b, and another propulsion force according to the hydraulic signal PSLU output from the linear solenoid valve SLU are balanced with each other.

When the lock-up relay valve 108 for engaging the lock-up clutch 11 is ON, the lock-up control valve 110 selects an oil path to drain the actuation oil from the disengaging-side oil chamber 12b via the lock-up relay valve 108 connected to either the drain port 110d or the second line path L2 according to the position of the valve spool 110a. Thus, the lock-up control valve 110 controls a pressure difference $\Delta P$ ($=P_{on}-P_{off}$) between the pressure $P_{on}$ of the engaging-side oil chamber 12a and the pressure $P_{off}$ of the disengaging-side oil chamber 12b, thereby maintaining a slip amount pursuant to the hydraulic signal PSLU.

A clutch control valve 114 includes a return spring 114s and a valve spool 114a. The valve spool 114a is normally located in one of the first to fourth gear steps according to the restoring force of the return spring 114s. However, when the output hydraulic pressure PSL2 of the linear solenoid valve SL2 or the engagement pressure PC2 of the clutch C2 acts thereon, the valve spool 114a may be located in the fifth or sixth gear step.

When the automatic transmission 14 is in one of the first to fourth gear steps, the clutch control valve 114 outputs the output hydraulic pressure PSL1 of the linear solenoid valve SL1 to a sequence valve 116 as a selected pressure POUT, and, at the same time, outputs a D-range pressure $PD_{1-4}$, which is generated in the first to fourth gear steps, to the sequence valve 116. However, in case of the fifth or sixth gear step, the clutch control valve 114 outputs the output hydraulic pressure PSL2 of the linear solenoid valve SL2 to the sequence valve 116 as the selected pressure POUT, and, at the same time, outputs a D-range pressure $PD_{5-6}$, which is generated in case of the fifth or sixth step, to the sequence valve 116.

The sequence valve 116 is a fail-safe valve used as a backup valve for securing a forward drive gear step in a malfunction. The sequence valve 116 includes a return spring 116s and a valve spool 116a, which is moved to a position at which a propulsion force generated by the output pressure PSLT of the linear solenoid valve SLT and another propulsion force generated by both the modulator pressure PM and the selected pressure POUT are balanced with each other.

Normally, the valve spool 116a is located to the right of a dot-and-dash line in FIG. 5, the output hydraulic pressures PSL1, PSL2, PSL4 of the linear solenoid valves SL1, SL2, SL4 are supplied to the clutches C1, C2 and the brake B3 (normal control mode). However, if a malfunction occurs in which the valve spool 116a is located to the left of the dot-and-dash line in FIG. 5, the output hydraulic pressures PSL1, PSL2, PSL4 of the linear solenoid valves SL1, SL2, SL4 are intercepted, and, at the same time, the D-range pressure $PD_{1-4}$, which is generated one of the first to fourth gear steps, is output to the clutch C1, or the D-range pressure $PD_{5-6}$, which is generated the fifth or sixth step, is output to the clutch C2, and the D-range pressure PD is output to the brake B3 (malfunction control mode).

Therefore, when the sequence valve 116 is switched to the malfunction control mode while the vehicle is driven in one of the first gear step to the fourth gear step, the first clutch C1 and the third brake B3 are engaged, thus forcibly establishing the third gear step. Further, when the sequence valve 116 is switched to the malfunction control mode while the vehicle is in motion with the transmission in the fifth gear step "5th" or the sixth gear step "6th", the second clutch C2 and the third brake B3 are engaged, thus forcibly establishing the fifth gear step "5th".

The solenoid relay valve 118 includes a valve spool 118a, which is normally kept in an OFF position by a restoring force of a return spring 118s, but is moved to an ON position when the output pressure PSL of the electromagnetic switching valve SL acts thereon. In the ON position, the valve spool 118a uses the first line pressure PL1 as an output pressure. However, in the OFF position, the valve spool 118a changes the output pressure to the D-range pressure PD, and, at the same time, supplies the output pressure to a clutch apply control valve 120 and a B1 apply control valve 122.

As shown in FIG. 2, if the shift lever 72 is in one of the P, R, N positions and an engine brake is being applied while driving, the electromagnetic switching valve SL is in the OFF state. Alternatively, if the automatic transmission 14 is in one of the first to sixth forward gear steps, or in the P position where the brake B3 is engaged, or in a reverse-prohibited (R-prohibited) state, the electromagnetic switching valve SL will be ON.

The clutch apply control valve 120 includes a valve spool 120a, on which an upward propulsion force, induced by the output pressure of the solenoid relay valve 118, and a downward propulsion force, induced both by the propulsion force generated by the D-range pressure PD, the engagement pressure PC1 of the clutch C1, the engagement pressure PC2 of the clutch C2 and the restoring force of the return spring 120s, act together.

When the downward propulsion force is greater than the upward propulsion force, in other words, when the shift lever 72 is in the R or N position or when the automatic transmission 14 is shifted to the fourth gear step, the valve spool 120a is located in a lower position in FIG. 5 (i.e., to the left of the dot-and-dash line). In this state, the D-range pressure $PD_4$ induced in case of the fourth gear step is output both to the B1 apply control valve 122 and the B2 apply control valve 124. Further, the output hydraulic pressure PSL4 is supplied via the sequence valve 116 to the B2 apply control valve 124, so that the R-range pressure PR is output to the brake B3 and the B2 apply control valve 124.

However, when the downward propulsion force is smaller than the upward propulsion force, in other words, when the shift lever 72 is in neither the R position nor the N position, or when the automatic transmission 14 is shifted to a shift gear step other than the fourth gear step, the valve spool 120a is located in an upper position in FIG. 5 (i.e., to the right of the dot-and-dash line). In this state, the D-range pressure PD is supplied to the B2 apply control valve 124, and, at the same time, the output hydraulic pressure PSL4 is output as the engagement pressure PB3 via the sequence valve 116 to the brake B3 and the B2 apply control valve 124.

The B1 apply control valve 122 includes a valve spool 122a, on which an upward propulsion force, induced by a propulsion force generated by the output pressure of the solenoid relay valve 118 and the restoring force of the return spring 122s, and a downward propulsion force, induced by the D-range pressure $PD_4$ of the clutch apply control valve 120 in case of the fourth gear step, the engagement pressure PB3 of the brake B3 and the output hydraulic pressure PSL3 of the linear solenoid valve SL3, act together.

When the upward propulsion force is greater than the downward propulsion force, the valve spool 122a is located in a normal position. However, when the upward propulsion force is smaller than the downward propulsion force, the valve spool 122a is located in an abnormal position. In the normal position, the output hydraulic pressure PSL3 of the linear solenoid valve SL3 is supplied to the brake B1. In the abnormal position, the output hydraulic pressure PSL3 of the linear solenoid valve SL3 is intercepted, and, at the same time, the oil of the brake B1 is drained via the drain port 122d. The fourth gear step is established by the engagement of the clutches C1 and C2, but, when the brake B1 is brought into the engagement, the B1 apply control valve 122 moves to the abnormal position.

The B2 apply control valve 124 includes a valve spool 124a, on which an upward propulsion force, induced by a propulsion force generated by the D-range pressure $PD_4$ of the clutch apply control valve 120 in case of the fourth gear step and the restoring force of the return spring 124s, and a downward propulsion force, induced by the engagement pressure PB3 of the brake B3, the engagement pressure PB1 of the brake B1 supplied from the B1 apply control valve 122 in the normal state and the output hydraulic pressure PSL2 of the linear solenoid valve SL2, act together.

When the upward propulsion force is greater than the downward propulsion force, the valve spool 124a is located to the left of a dot-and-dash line in FIG. 6. However, when the upward propulsion force is smaller than the downward propulsion force, the valve spool 124a is located to the right of the dot-and-dash line in FIG. 6. When the valve spool 124a is located to the left of the dot-and-dash line in FIG. 6, in other words, when the shift lever 72 is in the D or N position, the output hydraulic pressure PSL4 of the linear solenoid valve SL4 is output as the engagement pressure to the brake B2 via the communication path 126 and the B2 control valve 128. Further, in the D position, the actuation oil flowing from the brake B2 via the B2 control valve 128 is quickly drained via a bypass line 129, a drain port 124d, a quick drain path 130 and a manual valve 104. However, when the valve spool 124a is located to the right of the dot-and-dash line in FIG. 6, the output hydraulic pressure PSL4 is intercepted, and the actuation oil of the brake B2 is slowly drained via an orifice 134 that serves as a restrictor.

The B2 control valve 128 includes a valve spool 128a, on which an upward propulsion force, induced by a propulsion force generated by the engagement pressure of the brake B2 supplied via the solenoid relay valve 118 in the OFF state and the restoring force of the return spring 128s, and a downward propulsion force, induced by the hydraulic signal PSLU output from the linear solenoid valve SLU supplied via the lock-up clutch relay valve 108 in the OFF state, act together.

When the upward propulsion force is greater than the downward propulsion force, the valve spool 128a is located in a first position (an upper position in FIG. 6). However, when the upward propulsion force is smaller than the downward propulsion force, the valve spool 128a is located in a second position (a lower position in FIG. 6). Further, the B2 control valve 128 also has a first port 128b connected to a reverse line path L4 for drawing the R-range pressure PR, a second port 128c connected to the communication path 126, and an output port 128d connected to the brake B2. When the valve spool 128a is located in the first position pursuant to the OFF state of the hydraulic signal PSLU, the output port 128d is connected to the first port 128b. However, when the valve spool 128a is located in the second position pursuant to the ON state of the hydraulic signal PSLU, the output port 128d is connected to the second port 128c.

The reverse line path L4 is provided in the hydraulic circuit to draw the R-range pressure PR of the manual valve 104 from the R range port 104a to the B2 apply control valve 124, the B2 control valve 128, the clutch apply control valve 120 when the shift lever 72 is in the R position. However, when the shift lever 72 is in the N position, the reverse line path L4 is also used as a drain path of the brake B3. Both a check valve 132 and an orifice 134, which are coupled to each other in parallel, are provided in the reverse line path L4 at a position downstream of a branching point of the bypass line 129, that is, at a position between the B2 control valve 128 and the B2 apply control valve 124. The oil from the brake B2 is drained through the orifice 134 more slowly than the quick drain path 130. The check valve 132 is suppresses the influence of the orifice 134 on the supply of the R-range pressure PR.

In the hydraulic control circuit 98 configured as above, the brake B2 functions as a first-gear step and reverse gear step engagement element. The engagement pressure PSL4, which is output from the linear solenoid valve SL4, is supplied to the brake B2 via the sequence valve 116, the clutch apply control valve 120, the B2 apply control valve 124 and the B2 control valve 128. The brake B2 is brought into engagement by the simultaneous operation of the linear solenoid valve SL4 and the B2 control valve 128, which is controlled in response to the hydraulic signal PSLU output from the linear solenoid valve SLU.

Further, with regard to the path from the linear solenoid valve SL4 to the brake B2, the clutch apply control valve 120 functions as a switching valve for changing between a path to the brake B2 via the B2 apply control valve 124 and the B2 control valve 128 and another path to the brake B3. Thus, the output pressure, which is output from the linear solenoid valve SL4 to the brake B2 functioning as the first-gear step and reverse gear step engagement element, is prevented from being supplied to the brake B2 and the brake B3 (which functions as the second engagement element) at the same time.

Further, in the hydraulic control circuit 98, the B2 apply control valve 124 functions as a drain flow rate control valve. That is, the B2 apply control valve 124 changes a drain mode of the brake B2 between a quick drain mode in which the drain port 124d is opened so that the actuation oil is quickly drained from the brake B2 via the bypass line 129, the quick drain path 130, the reverse line path L4 and the manual valve 104, and a slow drain mode in which the drain port 124d is closed so that the actuation oil is slowly drained from the brake B2 via the orifice 134, the reverse line path L4 and the manual valve 104.

Returning to FIG. 3, the electronic control unit 90 includes a microcomputer having a CPU, RAM, ROM, input/output interface and the like. The CPU processes signals according to a program stored in the ROM while using the random access memory function of the RAM, thus executing an engine control process or a transmission control process. If necessary, the electric control unit may be divided into two parts for separately executing the engine control process and the transmission control process.

As shown in FIG. 2, to avoid a transmission shock, such as a rapid change in the drive force, and damaging to frictional parts of the frictional engagement elements, such as the clutches C or the brakes B, the electronic control unit 90 continuously controls the excitations of the linear solenoid valves SL1 to SL4, SLU, SLT and the electromagnetic switching valve SL of the hydraulic control circuit 98. In other words, the electronic control unit 90 continuously changes the engagement pressure PC1, PC2, PB1, PB2, PB3 of the clutches C or the brakes B according to the selected position of the shift lever 72.

Further, as shown in FIG. 2, in the automatic transmission 14 of the present embodiment, the gear step is shifted between neighboring gear steps by a clutch-to-clutch transmission, in which a gear step is established mainly through the engagement of two engagement elements, and the gear step is shifted by disengaging one of the clutches C and the brakes B and, at the same time, engaging another of the clutches C and the brakes B.

Figure 7:
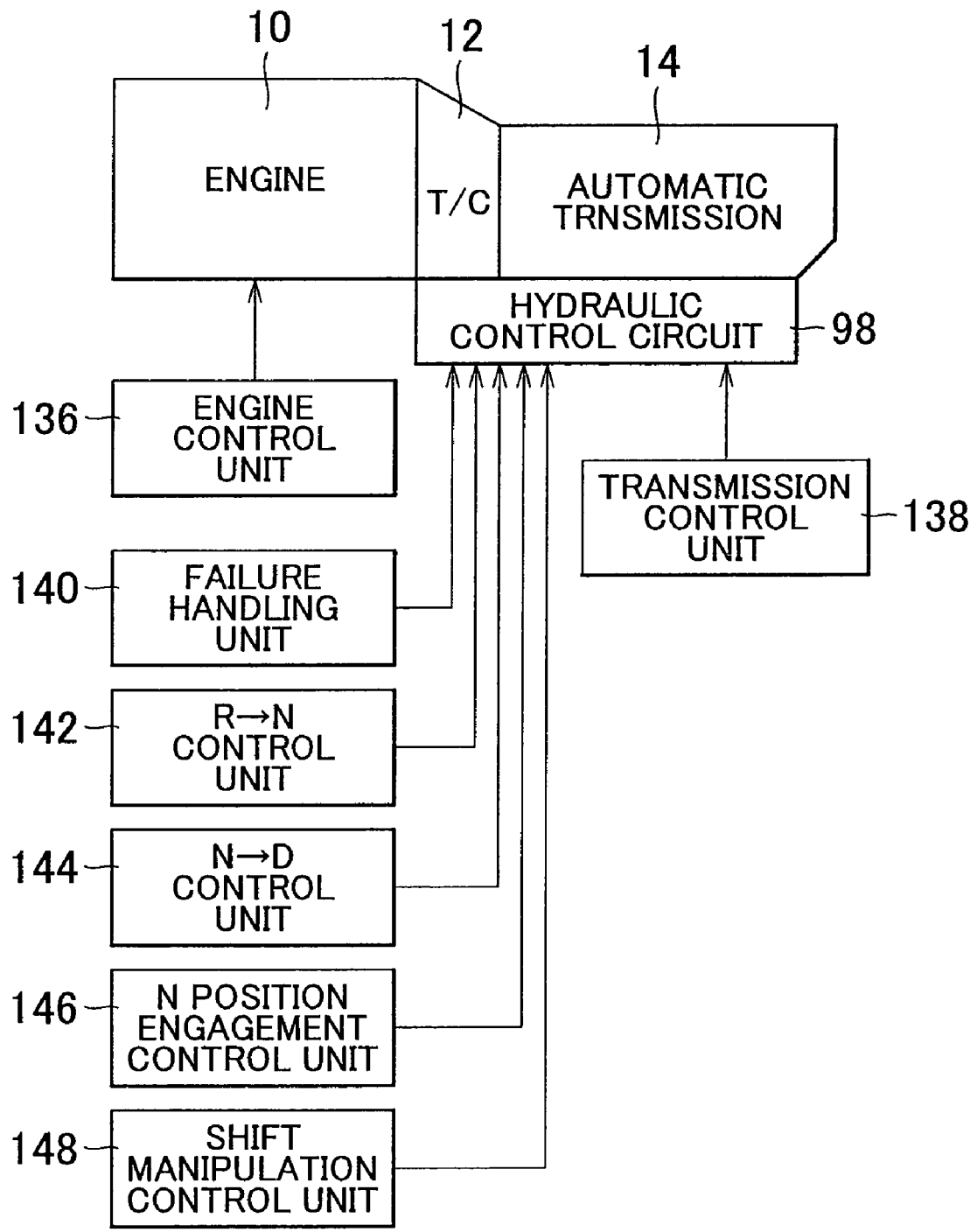
FIG. 7 is a block diagram illustrating main parts of the control functions of the electronic control unit shown in FIG. 3.

FIG. 7 is a block diagram illustrating main parts of the control function of the electronic control unit 90. The engine control unit 136 controls the electronic throttle valve 56 so that the electronic throttle valve 56 is opened and closed using the throttle actuator 54, so that the output power of the engine 10 is controlled to provide a desired drive force, and the throttle valve opening degree $\theta_{TH}$ is increased in proportion to the accelerator operation amount Acc. Further, the engine control unit 136 controls a fuel injection valve 92 to adjust the amount of injected fuel, and controls an ignition unit 94, such as an igniter, to regulate the ignition timing.

The transmission control unit 138 determines a target gear step of the automatic transmission 14 according to a stored transmission diagram (transmission map) based on the actual throttle valve opening degree $\theta_{TH}$ and the actual vehicle speed V. In other words, the transmission control unit 138 determines a target gear step from the existing gear step, and outputs a control signal to the automatic transmission 14, so that the automatic transmission 14 shifts to the target gear step (designated gear step).

Further, the failure handling unit 140 executes a specified fail-safe operation when there occurs a malfunction that is the automatic transmission 14 enters a neutral state. In this case, if the hydraulic switch SW1 and/or the hydraulic switch SW2 are operating normally and it is possible to identify the linear solenoid valve SL1 to SL4 that is failing, the failure handling unit 140 executes the specified fail-safe operation with respect to the particular the linear solenoid valve SL1, SL2, SL3, SL4 that has failed.

However, if the hydraulic switch SW1 and/or the hydraulic switch SW2 are malfunctioning and it is impossible to identify the particular linear solenoid valve SL1 to SL4 that has failed, the failure handling unit 140 selects one of the linear solenoid valves SL1, SL2, S13, SL4 that is suspected to be failing, based on the designated gear step when the malfunction is detected. Thereafter, the failure handling unit 140 executes the specified fail-safe operation with respect to the selected one of the linear solenoid valves SL1, SL2, S13, SL4.

Further, the electronic control unit 90 includes an R→N control unit 142 used to drain the actuation oil from the brake B2 more slowly than from the brake B3 in order to reduce a shock caused by a release of the reverse gear step when the shift lever 72 is manipulated as an R→N shift; an N→D control unit 144 used to quickly drain the actuation oil from the brake B2 in order to prevent a tie-up when the shift lever 72 is manipulated as an N→D shift; an N position engagement control unit 146; and a shift manipulation control unit 148.

When the shift lever 72 is shifted to the N position while the vehicle is stopped, the N position engagement control unit 146 simultaneously activates the linear solenoid valve (the first solenoid valve) SL4 and the linear solenoid valve SLU (the second solenoid valve). The B2 control valve 128, which is controlled by the hydraulic signal PSLU output from the linear solenoid valve SLU (the second solenoid valve), is thus activates, thereby engaging the brake B2. However, when the shift lever 72 is shifted from the D position to the N position while the vehicle is in motion, the N position engagement control unit 146 deactivates the linear solenoid valves SL4 and SLU to disengage the brake B2, thereby avoiding a transmission tie-up.

The valve spool 120a in the clutch apply control valve 120 may fail to properly operate by being displaced in an extending direction of the return spring 120s immediately after the shift lever 72 is shifted from the D position to the R position (D→R shift). It results from a decrease in the line pressure PL1 induced by the stroke of the brake B2, and a remainder of the C1 disengagement pressure generated by the accumulator control. To avoid this problem, the shift manipulation control unit 148 reduces a pressured area on which the C1 pressure is exerted to increase an allowable level of low line pressure. Thus, the above-mentioned movement of the valve spool 120a is prevented.

Further, to make the R→N control be compatible with the N→D control, the shift manipulation control unit 148 temporarily switches the electromagnetic switching valve SL ON when the shift lever 72 is shifted from the R position to the N position (R→N shift) to establish the R→N control. Thus, the valve spool 124a in the B2 apply control valve 124 is moved downwards, and the drain port 124d is closed. Thus, the actuation oil is slowly drained from the brake B2. In the N→D control, executed when the shift lever 72 shifted from the N position to the D position (N→D shift), the valve spool 124a of the B2 apply control valve 124 is retained in the upper position to open the drain port 124d. Thus, the oil would be quickly drained from the brake B2.

Further, the lock-up relay valve 108 is switched ON in response to the D-range pressure PD. Thus, the following two advantages may be achieved. First, just after the engine is started, a pre-charge is applied to the brake B3 by switching the solenoid relay valve 118 to the ON position when the electromagnetic switching valve SL is ON and the shift lever is in the P position. At this time, because the D-range pressure PD is not generated, and the lock-up relay valve 108 is not operated, and thus, the torque converter 12 is not affected thereby.

Second, when the N→R shift is executed, it is possible to avoid a malfunction of the engine due to a drain delay of the linear solenoid valve SLU. In the N position, the linear solenoid valve SLU is ON. However, due to the N→R shift, the linear solenoid valve SLU is switched OFF and the electromagnetic switching valve SL is switched ON. If the lock-up relay valve 108 is switched ON when the electromagnetic switching valve SL is ON, an engine malfunction may be caused by an occurrence of a drain delay of the linear solenoid valve SLU. However, in the present embodiment, the lock-up relay valve 108 is switched by the D-range pressure PD. Thus, the lock-up relay valve 108 is not switched by the N→R shift, so that the malfunction of the engine is avoided.

As described above, in accordance with the present embodiment, the automatic transmission 14 is operated to establish a plurality of transmission gear steps by selectively operating a plurality of engagement elements including the brake (first-gear step and reverse gear step engagement element) B2 for establishing the first gear step and the reverse gear step, wherein the brake B2 is engaged when the shift lever (gear selection device) 72 is shifted to a reverse gear step position. The automatic transmission 14 is provided with both a linear solenoid valve SL4 and the B2 control valve 128 that cause the engagement of the brake B2 when operated simultaneously; and the N position engagement control unit 146, which activates the linear solenoid valves SL4 and SLU when the shift lever 72 is shifted to the neutral position, thereby engaging the brake B2.

Therefore, when the shift lever 72 is shifted to the N position, both of the linear solenoid valves SL4 and SLU are activated to engage the brake B2. Thus, when the shift lever 72 is shifted from the N position to the R position, the brake B2 is already engaged, and the second engagement element (the brake B3) is subsequently engaged to establish the reverse gear step. Therefore, it is possible to appropriately prevent a shock when the shift lever 72 is shifted from the N position to the R position.

Further, the brake B2, which serves for both of the 1st gear step and the R gear step, may be engaged by the operations of both of the linear solenoid valves SL4 and SLU. Therefore, the engagement of the brake B2 may be avoided when a single failure takes place in either the linear solenoid valves SL4 or SLU. Thus, when the shift lever 72 is shifted from the D position to the N position when the vehicle is driven, it is possible to appropriately prevent excessive rotation of the rotary elements in the automatic transmission 14 (especially the sun gears in the planetary gear sets 26 and 28 that constitute a Ravigneaux planetary gear train) that might be caused by the engagement (ON failure) of the brake B2.

Further, in accordance with the present embodiment, if the shift lever (gear selection device) 72 is shifted to the N position when the vehicle is stopped, the N position engagement control unit 146 activates both the linear solenoid valves SL4 and SLU to engage the brake B2. However, if the vehicle is in motion, the N position engagement control unit 146 inactivates both the linear solenoid valve SL4 and SLU to disengage the brake B2. Thus, it is possible to prevent of tie-up from occurring when the shift lever 72 is shifted to the N position when the vehicle is in motion.

Further, in accordance with the present embodiment, the B2 apply control valve (drain flow rate control valve) 124 is installed for controlling the flow rate of the oil drained from the brake B2 functioning as the first-gear step and reverse gear step engagement element. Therefore, when the brake B2 is disengaged, the flow rate of the oil drained from the brake B2 is changed by the B2 apply control valve 124 in response to the signal pressure PSL produced from the electromagnetic switching valve SL.

For example, when the gear selection device is shifted from the reverse gear step, which is established by of the brake B2 serving for the 1st and the R gear step and the brake B3, to the N position, an R→N control is executed so that oil is first drained from the brake B3 and then oil is drained from the brake B2 via the orifice 134, thereby preventing generation of a shock. In addition, if the gear selection device is shifted from the N position, in which the brake B2 is engaged, to the D position to bring the clutch C1 and the brake B1 (functioning as the second engagement element) into the engaged state, a tie-up may occur if the brake B2 has not yet been released. To avoid this problem, an N→D control, which is compatible with the R→N control, may be executed to quickly drain the oil from the brake B2 via the B2 apply control valve 124 and the quick drain path 130. Therefore, at the N→D control, it is possible to prevent the tie-up that may be caused by a delay in draining the first-gear step and reverse gear step engagement element.

Further, the above-described drain control executed by the B2 apply control, valve (drain flow rate control valve) 124 may also be applied to the drain in the brake B3. Specifically, in normal cases, the draining of the oil from the brake B3 is normally executed by the control of the linear solenoid valve SL4 or the orifice 134. However, when switching to the fourth gear step, the oil of the brake B3 is quickly drained via both the B2 apply control valve 124 and the quick drain path 130 to avoid a tie-up in case of a failure of the fourth gear.

Further, in accordance with the present embodiment, the clutch apply control valve (switching valve) 120 supplies the output pressure, which is output from SL4 to the brake B2 serving for both the 1st and the R gear step to either the brake B2 or the brake B3 (functioning as the second engagement element).

Therefore, the output pressure output from the linear solenoid valve SL4 to the brake B2 serving for both the 1st and the R gear step is prevented from being supplied to both of the brake B2 and the brake B3 (functioning as the second engagement element). Thus, an unexpected transmission gear step, which may be established through the simultaneous engagement of both of the brakes B2 and B3, is prevented.

Further, in the embodiment of the present invention, the clutch apply control valve (switching valve) 120 switches the pressure supplied to the brake B3 (functioning as the second engagement element) between the regulation pressure (output hydraulic pressure PSL4 of the linear solenoid valve SL4) and the holding pressure (R-range pressure PR). Thus, it is not necessary to provide an additional solenoid valve to control the engagement pressure of the brake B3.

Further, in accordance with the present embodiment, the clutch apply control valve (switching valve) 120 is used to prevent the output pressure from being supplied to the brake B3 (functioning as the second engagement element) when the automatic transmission 14 enters a transmission gear step. Therefore, for example, when the automatic transmission 14 establishes the 4th gear step by the engagement of the clutches C1 and C2, the clutch apply control valve 120 intercepts the supply of hydraulic pressure to the brake B3. Thus, a fail safe may be achieved by using one switching valve.

Further, in accordance with the present embodiment, the reverse line path (drain communication path) L4 is provided for communicating the drain path of the clutch apply control valve (switching valve) 120 with the drain path of the B2 apply control valve (drain flow rate control valve) 124 when the automatic transmission 14 enters a specified transmission gear step. Thus, it is advantageous in that, when the automatic transmission 14 enters, for example, the fourth gear step, a drain path for the second engagement element may be formed via the clutch apply control valve (switching valve) 120.

Further, in accordance with the present embodiment, the torque converter (hydraulic transmission unit) 12 to which the lock-up clutch 11 attached is provided in the input side of the automatic transmission 14, and the lock-up relay valve 108, serving as a lock-up clutch switching valve, is provided for switching the state the lock-up clutch 11 between the engaged state and the disengaged state. In addition, the manual valve 104 is provided for outputting the D-range pressure when the shift lever (gear selection device) 72 is shifted to the D gear step position. Herein, the lock-up relay valve 108 is switched by the D-range pressure PD produced from the solenoid relay valve 118 when the electromagnetic switching valve SL is in the ON state. Thus, when shifting from the N position to the R position, the electromagnetic switching valve SL is rendered in the ON state. Accordingly, the D-range pressure is not output. Therefore, the lock-up relay valve 108 is not switched and the lock-up clutch 11 is not brought into engagement. Thus, the engine stall caused by the solenoid drain delay in the linear solenoid valve SLU is avoided.

Figure 8:
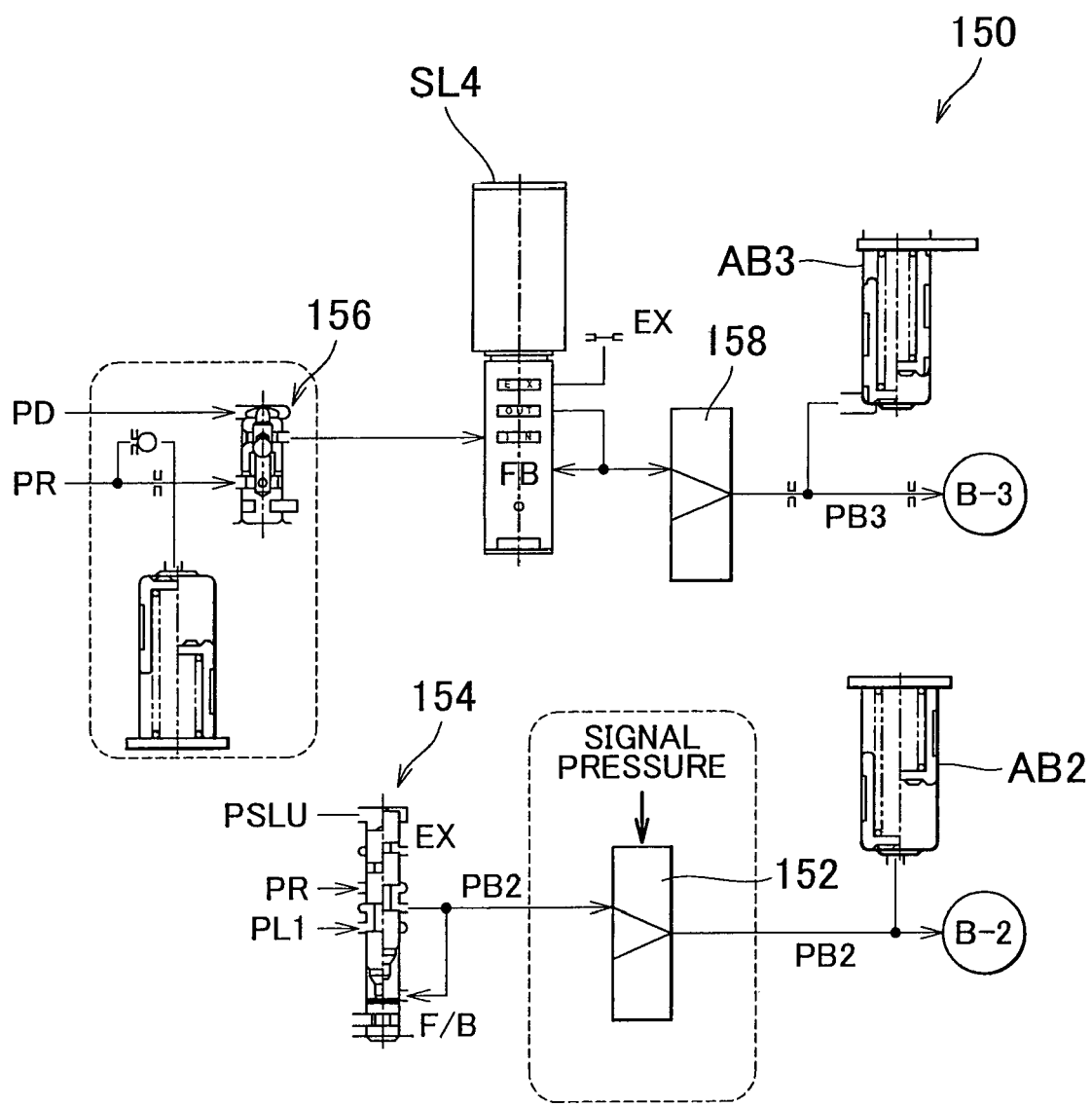
FIG. 8 is a diagram illustrating main parts of a hydraulic control circuit in accordance with another embodiment of the present invention.

FIG. 8 is a diagram illustrating main parts of a hydraulic control circuit 150 in accordance with another embodiment of the present invention. In the hydraulic control circuit 150, a B2 pressure control valve 154 is provided. When the hydraulic signal PSLU, output from the linear solenoid valve SLU, is OFF, the B2 pressure control valve 154 outputs the R-range pressure PR to the brake B2 via a shift valve 152. However, when the hydraulic signal PSLU is ON, the B2 pressure control valve 154 regulates the B2 pressure PB2 according to the hydraulic signal PSLU using the first line pressure PL1 as an original pressure to thereby output the regulated B2 pressure PB2 to the brake B2 via the shift valve 152.

The hydraulic control circuit 150 further includes a three-way check valve 156, which supplies a high pressure of either the D-range pressure PD or the R-range pressure PR to the linear solenoid valve SL4 as an original pressure; and a shift valve 158 provided between the linear solenoid valve SL4 and the brake B3 in the hydraulic control circuit 150.

The hydraulic control circuit 150 in accordance with the present embodiment is configured to achieve the fail-safe function and the garage shift control similar to those of the hydraulic control circuit 98 by engaging the brake B2 at the P-range and N-range pressures. To avoid a simultaneous engagement of the brakes B2 and B3 in the N position when controlling the brake B2, the three-way check valve 156 sets either the D-range pressure PD or the R-range pressure PR to be an original pressure of the brake B3 in the hydraulic control circuit 150.

Further, an accumulator AB3 is provided to accumulate the original pressure for disengaging the brake B3 by the linear solenoid valve SL4 at the time of an R→N shift. The hydraulic control circuit 150 is further provided with the shift valve (switching valve) 152, which is controlled in response to a signal pressure to disengage the brake B2 if a single failure occurs while the shift lever is in the N position when the vehicle speed is higher than a reference speed. In the present embodiment, in case of the N and P positions, the brake B3 cannot be engaged, and only the brake B2 is engaged.

In the above, the embodiments of the present invention have been described in detail with reference to the drawings. However, without being limited thereto, the present invention may also be applied to other configurations.

For example, in the above-mentioned embodiments, the engine 10 is used as the drive power source. However, a motor or a hybrid-type power source may also be used as the drive power source. Further, the automatic transmission 14 in the above embodiments is a six-step automatic transmission, which has a planetary gear set and six forward steps. However, the present invention may also be applied to other types of automatic transmission, in which, e.g., the number of gear steps and/or the number of engagement elements are different from those of the automatic transmission 14.

Further, the engagement elements may be single-disc or multiple-disc clutches or brakes, or belt brakes engaged by hydraulic actuators such as hydraulic cylinders. Furthermore, the transmission may be controlled, for example, by changing the hydraulic pressure (engagement pressure) in a specific pattern according to the hydraulic pressure control of a solenoid valve, an operation of an accumulator or the like; or by changing the hydraulic pressure at preset timings. Further, a direct pressure control, in which output pressures of large-capacity solenoid valves (linear solenoid valves, etc.) are directly supplied to engage the engagement elements, may be employed. However, the hydraulic pressure control may also be executed via control valves that are regulated by the output pressures of the solenoid valves.

Further, although the brake B2 is described as the first-gear step and reverse gear step engagement element in the hydraulic control circuit 98, the second engagement element may be used as such. In addition, in the above embodiments, the brake B2 may be engaged by a simultaneous operation of the linear solenoid valve (the first solenoid valve) SL4 and the linear solenoid valve SLU (the second solenoid valve). However, other valve may be used instead of the linear solenoid valves SL4 and SLU.

While the invention has been shown and described with respect to the example embodiments, it will be understood by those skilled in the art that various changes and modifications may be made without departing from the scope of the invention as defined in the following claims.

The invention claimed is:

1. A hydraulic control system for an automatic transmission for a vehicle, comprising:
   only two valves, namely, a first solenoid valve and a second solenoid valve that are operated simultaneously to engage a first-gear step and reverse gear step engagement element for establishing a first gear step and a reverse gear step; and
   an N position engagement control unit that allows only the first solenoid valve and the second solenoid valve to be activated while a gear selection device is shifted to a neutral-gear step position to engage the first-gear step and reverse-gear step engagement element,
   wherein the automatic transmission is operated to establish a plurality of transmission gear steps by selectively operating a plurality of engagement elements including the first-gear step and reverse-gear step engagement element, and wherein the hydraulic control system engages the first-gear step and reverse-gear step engagement element when the gear selection device is shifted to a reverse-gear step position.

2. The hydraulic control system of claim 1,
   wherein, when the gear selection device is shifted to the neutral-gear step position while the vehicle is stopped, the N position engagement control unit activates both the first solenoid valve and the second solenoid valve to engage the first-gear step and reverse-gear step engagement element, and
   wherein, while the vehicle is in motion, the N position engagement control unit deactivates both the first solenoid valve and the second solenoid valve to disengage the first-gear step and reverse-gear step engagement element.

3. The hydraulic control system of claim 1, further comprising:
   a drain flow rate control valve that controls a flow rate of oil drained from the first-gear step and reverse-gear step engagement element.

4. The hydraulic control system of claim 1, further comprising:
   a switching valve that supplies an output pressure, which is output from either the first solenoid valve or the second solenoid valve to the first-gear step and reverse-gear step engagement element, to either the first-gear step and reverse-gear step engagement element or a second engagement element of the plurality of engagement elements.

5. The hydraulic control system of claim 4, wherein the switching valve switches between supplying a regulation pressure and a holding pressure to the second engagement element.

6. The hydraulic control system of claim 4, wherein, when the automatic transmission enters a transmission gear step, the switching valve is switched to prevent the output pressure from being supplied to the second engagement element.

7. The hydraulic control system of claim 4, further comprising:
   a drain communication path that communicates a drain path of the switching valve with a drain path of the drain flow rate control valve when the automatic transmission enters a specified transmission gear step.

8. The hydraulic control system of claim 1, further comprising:
   a hydraulic transmission unit provided in an input side of the automatic transmission;
   a lock-up clutch, attached to the hydraulic transmission unit;
   a lock-up clutch switching valve that is switched to engage and disengage the lock-up clutch; and
   a manual valve for outputting a D-range pressure when the gear selection device is shifted to a D gear step position, wherein the lock-up clutch switching valve is switched by the D-range pressure.

9. A control method for an automatic transmission for a vehicle, comprising:
   engaging a first-gear step and reverse-gear step engagement element for establishing a first-gear step and a reverse-gear step while a gear selection device is shifted to a neutral gear step position, and
   wherein the automatic transmission further includes only two valves, namely a first solenoid valve and a second solenoid valve, that are operated simultaneously to engage the first-gear step and reverse-gear step engagement element, and the control method further comprises activating only the first solenoid valve and the second solenoid valve to engage the first-gear step and reverse-gear step engagement element when the gear selection device is shifted to a neutral gear step position, wherein the automatic transmission is operated to establish a plurality of transmission gear steps by selectively operating a plurality of engagement elements including the first-gear step and reverse-gear step engagement element, and wherein the first-gear step and reverse-gear step engagement element is engaged when the gear selection device is shifted to a reverse-gear step position.

10. The control method of claim 9, further comprising:
activating both the first solenoid valve and the second solenoid valve to engage the first-gear step and reverse-gear step engagement element when the gear selection device is shifted to the neutral gear step position when the vehicle is stopped; and
deactivating both the first solenoid valve and the second solenoid valve to disengage the first-gear step and reverse-gear step engagement element when the vehicle is in motion.

11. The control method of claim 9, further comprising:
supplying an output pressure, which is output from either the first solenoid valve or the second solenoid valve to the first-gear step and reverse-gear step engagement element, to either the first-gear step and reverse-gear step engagement element or a second engagement element of the plurality of engagement elements.

12. The control method of claim 11 further comprising: interrupting the supply of the output pressure to the second engagement element when the automatic transmission enters a specified transmission gear step.

13. The control method of claim 9, wherein a hydraulic transmission unit; a lock-up clutch, attached to the hydraulic transmission unit; and a lock-up clutch switching valve that is switched to engage and disengage the lock-up clutch are provided in an input side of the automatic transmission, and the control method further comprises:
switching the lock-up clutch switching valve using the D-range pressure when the gear selection device is shifted to a D gear step position.

* * * * *